United States Patent
Seo et al.

(10) Patent No.: US 6,734,586 B2
(45) Date of Patent: May 11, 2004

(54) ALTERNATOR HAVING VACUUM PUMP CAPABLE OF IMPROVING COOLING CHARACTERISTIC

(75) Inventors: Dong-Won Seo, Kyongju-si (KR); Hyun-Cheol Lee, Daegu-si (KR); Kyung-Sik Choi, Kyongju-si (KR); Hyung-Tae Bang, Kyongju-si (KR); Byung-Tae Kim, Kyongju-si (KR)

(73) Assignee: Valeo Mando Electrical Systems Korea Limited, Kyongsangbuk-do (KR)

( * ) Notice: Subject to any disclaimer, the term of this patent is extended or adjusted under 35 U.S.C. 154(b) by 66 days.

(21) Appl. No.: 10/158,395

(22) Filed: May 29, 2002

(65) Prior Publication Data

US 2003/0094815 A1 May 22, 2003

(30) Foreign Application Priority Data

Nov. 16, 2001 (KR) .................... 2001-0071254

(51) Int. Cl.⁷ ................................ H02K 1/32
(52) U.S. Cl. .............. 310/64; 310/62; 310/63
(58) Field of Search .............. 310/64, 62, 63, 310/52, 58; 290/1 B

(56) References Cited

U.S. PATENT DOCUMENTS

| | | | | |
|---|---|---|---|---|
| 4,486,668 A | * | 12/1984 | Asahi et al. ................ | 290/1 B |
| 5,959,385 A | * | 9/1999 | Kato et al. ................... | 310/112 |
| 6,082,340 A | * | 7/2000 | Heimark ................... | 123/559.1 |
| 6,259,182 B1 | * | 7/2001 | Yoshioka et al. ........... | 310/232 |
| 6,570,279 B2 | * | 5/2003 | Lee ........................... | 310/68 D |

* cited by examiner

*Primary Examiner*—Dang Le
(74) *Attorney, Agent, or Firm*—R. Neil Sudol; Henry D. Coleman; William J. Sapone

(57) ABSTRACT

In an alternator having a vacuum pump capable of improving a cooling characteristic, and having a rotary shaft supported by bearings installed in a rear bracket of the alternator, a housing of the vacuum pump has vanes and a rotation rotor is installed on the rotary shaft. A pump bracket is assembled to a lower portion of the housing and includes a packing inserted in an outer circumferential portion of a center shaft hole of the pump bracket for implementing a sealing operation in surface-contact with the rear bracket. A certain space is formed between the packing and the shaft hole for preventing a heat transfer, and a heat radiating unit is installed in a lower surface of the pump bracket.

2 Claims, 3 Drawing Sheets

【Fig. 1】
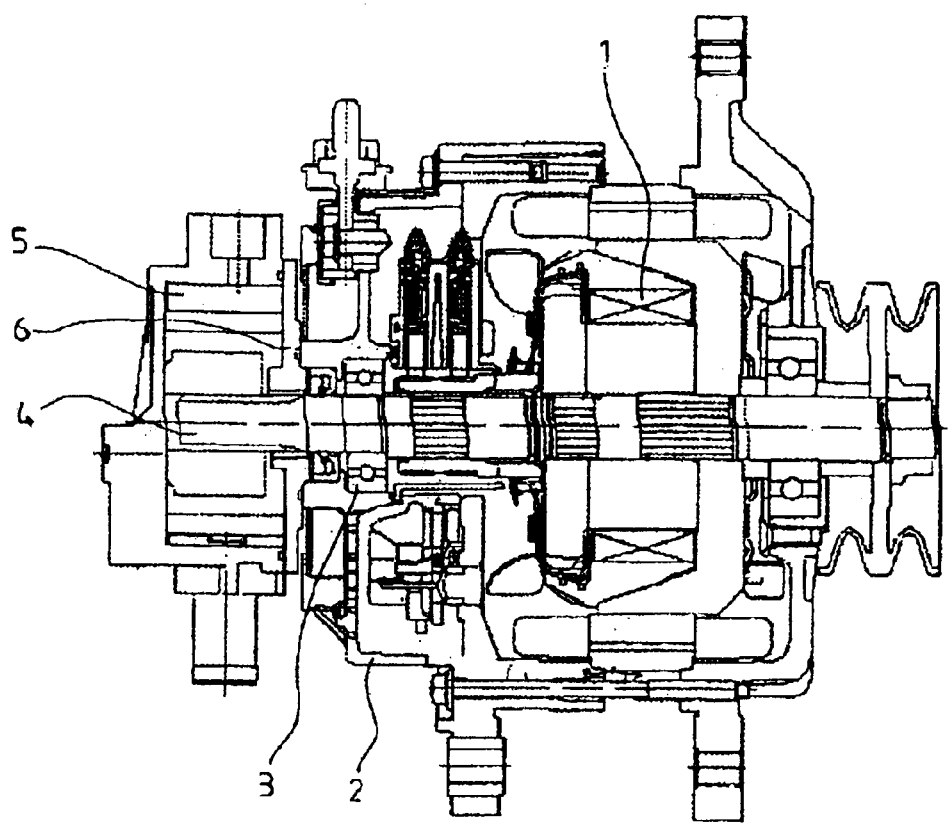

[Fig. 2]
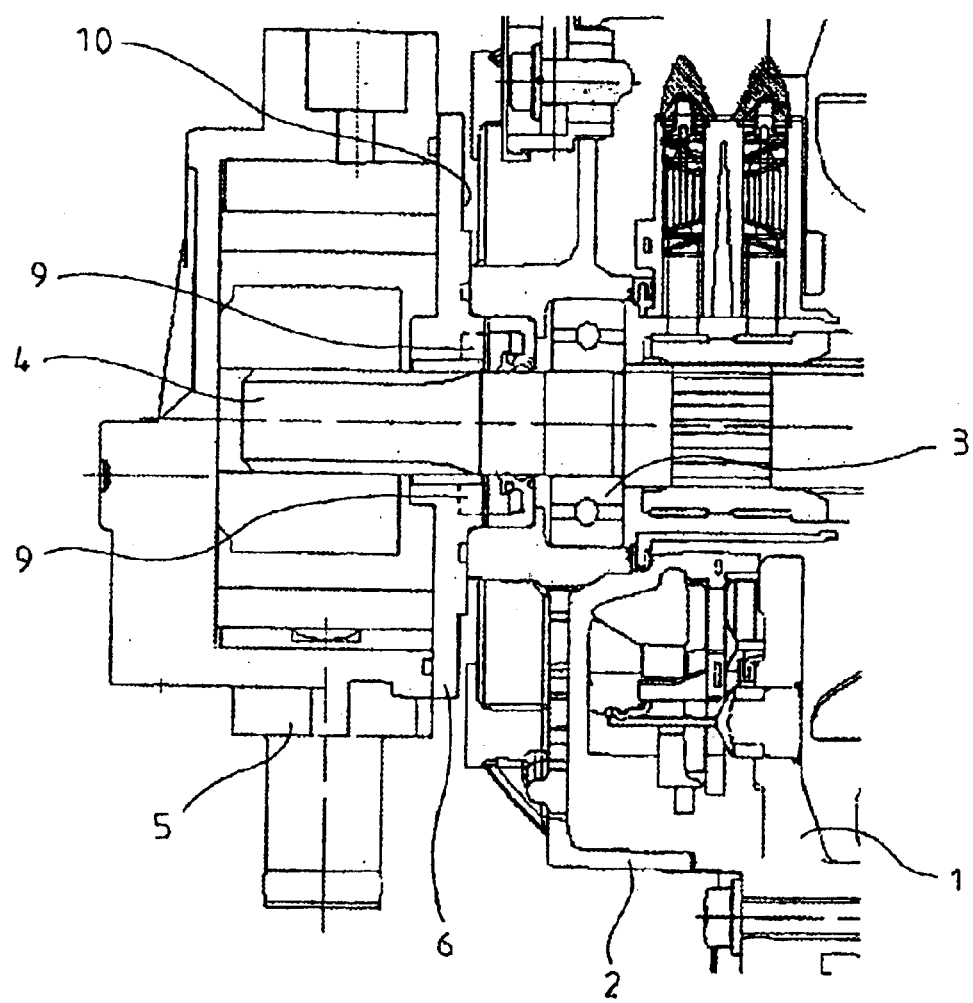

[Fig. 3]
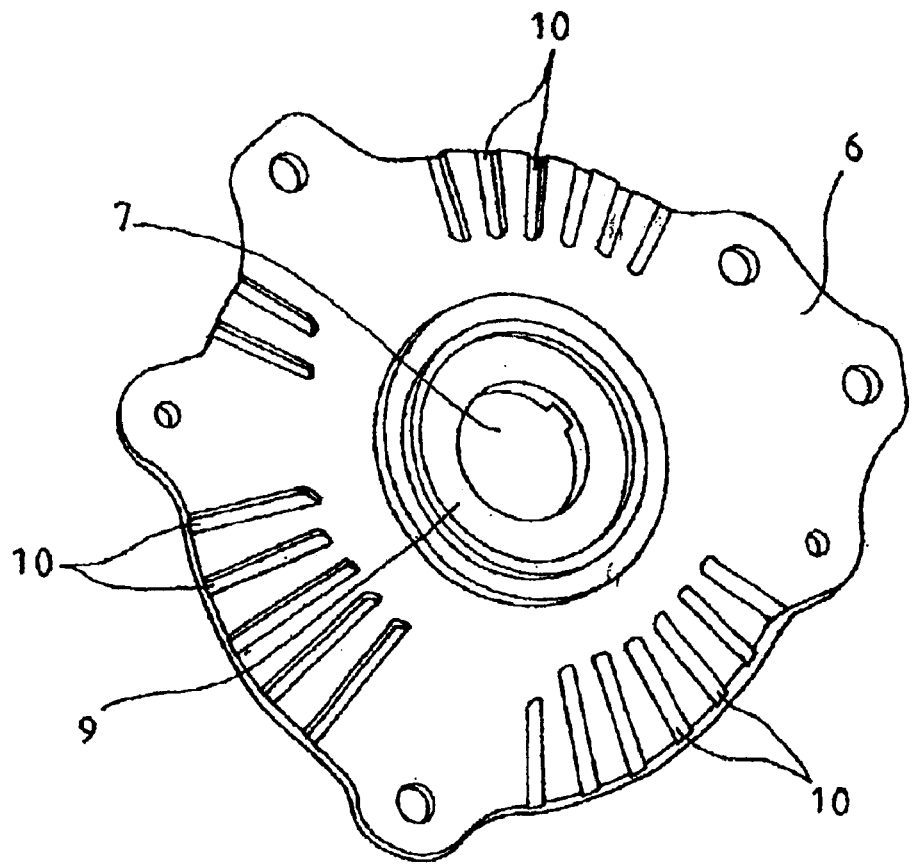
[Fig. 4]
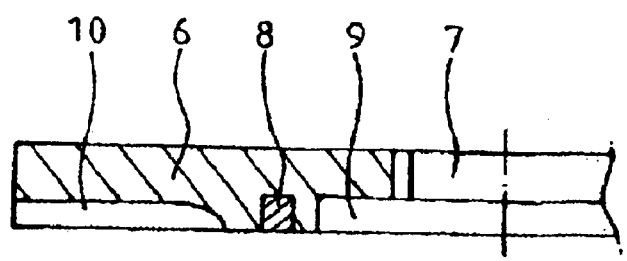

ALTERNATOR HAVING VACUUM PUMP CAPABLE OF IMPROVING COOLING CHARACTERISTIC

BACKGROUND OF THE INVENTION

1. Field of the Invention

The present invention relates to an alternator having a vacuum pump capable of improving a cooling characteristic, and in particular to an alternator having a vacuum pump capable of improving a cooling characteristic which is capable of restraining a heat transfer to a bracket and brush of an alternator by effectively radiating a heat of a vacuum pump by providing a cooling unit which performs a heat sink function in a bracket installed in one side of a housing of a vacuum pump and capable of preventing a heat-degradation of oil supplied to the brush and into the vacuum pump in a vehicle vacuum pump which is installed in a portion of an alternator of a vehicle and which supports an operation of a brake, for thereby significantly enhancing a durability of the brush.

2. Description of the Background Art

Generally, in an alternator which is installed for a power supply of a vehicle, a vacuum pump is installed in a bracket of an alternator on the same axis of a rotary shaft of an alternator for thereby supporting an operation of a brake of a vehicle such as a diesel engine vehicle. The above vacuum pump is capable of sucking air into a housing, supplying oil, compressing the air using vanes. The compressed air is discharged through an outlet for thereby obtaining a certain vacuum. The thusly obtained vacuum is provided to the brake of a vehicle for thereby obtaining a certain braking force when a vehicle starts.

In the above conventional vacuum pump, a pump bracket is installed in surface-contact with a rear bracket of an alternator. A vacuum pump housing is installed in the pump bracket. The rotation rotor having vanes is installed in the interior of the housing. The rotation rotor is connected with a rotary shaft of the alternator on the same axis and operates together with the alternator when the engine starts for thereby generating a certain vacuum.

However, in the above conventional alternator, as the alternator operates, when the vacuum pump operates, a high temperature oil may be flown into the housing. As the rotation rotor of the vacuum pump operates, a high temperature heat occurs based on a friction between the vanes and the housing. The thusly generated high temperature heat may be transferred to the rear bracket and brush of the alternator through the pump bracket because there is not an effective heat radiating function in the system. Therefore, the bearings installed in the rear bracket and the pump bracket may be heat-degraded. As the brush of the alternator is heat-degraded, the durability of the bearings and brush may be significantly decreased.

In addition, the oil supplied to the vacuum pump may be over-heated by a continuing increase of heat, the vacuum pump may be critically heat-degraded. Therefore, the viscosity of the oil may be decreased for thereby decreasing the performance of the vacuum pump. In the case that the durability of the bearings is decreased, a certain gap may be formed between the bearings and the rotary shaft, so that oil may be leaked from the vacuum pump. Therefore, it is impossible to implement an efficient rotation of the rotary shaft, so that the performances of the vacuum pump and alternator are significantly decreased.

SUMMARY OF THE INVENTION

Accordingly, it is an object of the present invention to provide an alternator having a vacuum pump capable of improving a cooling characteristic which overcomes the problems encountered in the conventional art.

It is another object of the present invention to provide an alternator having a vacuum pump capable of improving a cooling characteristic which is capable of restraining a heat transfer to a bracket and brush of an alternator by effectively radiating a heat of a vacuum pump by providing a cooling unit which performs a heat sink function in a bracket installed in one side of a housing of a vacuum pump and capable of preventing a heat-degradation of oil supplied to the brush and into the vacuum pump in a vehicle vacuum pump which is installed in a portion of an alternator of a vehicle and which supports an operation of a brake, for thereby significantly enhancing a durability of the brush.

In order to achieve the above objects, there is provided an alternator having a vacuum pump capable of improving a cooling characteristic which includes a packing inserted in an outer circumferential portion of a center shaft hole of the pump bracket for implementing a sealing operation in surface-contact with the rear bracket, a certain space formed between the packing and the shaft hole for preventing a heat transfer, and a heat radiating unit installed in a lower surface of the pump bracket in the alternator in which a rotary shaft supported by bearings is installed in a rear bracket of an alternator, a housing of a vacuum pump having vanes and a rotation rotor is installed on the rotary shaft, and a pump bracket is assembled to a lower portion of the housing.

BRIEF DESCRIPTION OF THE DRAWINGS

The present invention will become better understood with reference to the accompanying drawings which are given only by way of illustration and thus are not limitative of the present invention, wherein;

FIG. 1 is a view illustrating the construction that a vacuum pump is installed in an alternator according to the present invention;

FIG. 2 is a view illustrating an installed state of a vacuum pump according to the present invention;

FIG. 3 is a perspective view illustrating a pump bracket according to the present invention; and FIG. 4 is a cross-sectional view illustrating a pump bracket according to the present invention.

DETAILED DESCRIPTION OF THE PREFERRED EMBODIMENTS

The preferred embodiments of the present invention will be described with reference to the accompanying drawings.

In an alternator in which a rotary shaft 4 supported by bearings 3 is installed in a rear bracket 2 of an alternator 1, a housing 5 of a vacuum pump having vanes and a rotation rotor is installed on the rotary shaft 4, and a pump bracket 6 is assembled to a lower portion of the housing 5, an improved alternator having a vacuum pump capable of improving a cooling characteristic comprises a packing 8 inserted in an outer circumferential portion of a center shaft hole 7 of the pump bracket 6 for implementing a sealing operation in surface-contact with the rear bracket 2, a certain space 9 formed between the packing 8 and the shaft hole 7 for preventing a heat transfer, and a plurality of heat radiating grooves 10 formed in a lower surface of the pump bracket 6.

The operation of the alternator having a vacuum pump capable of improving a cooling characteristic according to the present invention will be described with reference to the accompanying drawings.

In a state that the rotary shaft 4 supported by the bearings 3 is installed in the rear bracket 2 of the alternator, and the vacuum pump having the vanes and rotary shaft is installed on the rotary shaft, when the alternator 1 operates, the rotary shaft 4 installed in the alternator 1 is rotated, and the rotation rotor and vanes installed in the housing 5 of the vacuum pump are rotated. When the rotation rotor is rotated, the oil is supplied into the housing 5 of the vacuum pump and is compressed therein for thereby having a certain compression pressure. When the above compression pressure is discharged through the outlet, a vacuum force is generated for thereby driving a braking unit of a vehicle. When the vacuum pump operates, a friction heat occurs based on the rotations of the vanes and rotation rotor in the vacuum pump, and the oil is compressed and becomes a high temperature heat and is transferred to the housing 5 of the vacuum pump.

The heat transferred to the housing 5 of the vacuum pump is transferred to the rear bracket 2 surface-contacting with the pump bracket 6 through the pump bracket 6. The heat transferred to the rear bracket 2 is transferred to the bearings 3 and the brush installed in the rear bracket 2 of the alternator 1. Since a certain space 9 is formed between the packing 8 which performs a sealing function based on a surface-contact with the center shaft hole 7 of the pump bracket 6 and the rear bracket 2, the heat transfer is blocked. Therefore, the heat transfer in the direction of the brush of the bearings 3 is prevented.

In addition, the heat transferred to the pump bracket 6 is radiated into the air by a plurality of heat radiating grooves 10 which are formed in the lower surface of the pump bracket 6 in a radial shape, so that it is possible to prevent a high temperature heat from being transferring to the bearings 3 and the rear bracket 2, whereby the heat-degradation of the oil supplied into the vacuum pump based on the radiating operation of the heat is effectively prevented.

As described above, in the alternator having a vacuum pump capable of improving a cooling characteristic according to the present invention, it is possible to prevent the heat generated in the vacuum pump from being directly transferred to the bearings 3 and the brush installed in the rear bracket 2 by forming the space 9 in the pump bracket 6 of the vacuum pump installed in surface-contact with the rear bracket 2 of the alternator 1 for preventing the heat from being transferred to the bearings which support the rotary shaft. In addition, the heat generated in the vacuum pump is effectively radiated by a plurality of heat radiating grooves 10 formed in the pump bracket 6 in a radial shape for thereby cooling the vacuum pump. Furthermore, it is possible to prevent a heat-degradation of oil supplied to the vacuum pump based on the heat radiating operation and prevent a decrease of the durability of the bearings and brush for thereby significantly enhancing the performances of the vacuum pump and alternator.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an alternator in which a rotary shaft supported by bearings is installed in a rear bracket of an alternator, a housing of a vacuum pump having vanes and a rotation rotor is installed on the rotary shaft, and a pump bracket is assembled to a lower portion of the housing, an improved alternator having a vacuum pump capable of improving a cooling characteristic, comprising:

a packing inserted in an outer circumferential portion of a center shaft hole of the pump bracket for implementing a sealing operation in surface-contact with the rear bracket;

a certain space formed between the packing and the shaft hole for preventing a heat transfer; and a heat radiating means installed in a lower surface of the pump bracket.

2. The alternator of claim 1, wherein said heat radiating means is formed in such a manner that a plurality of heat radiating grooves 10 are formed in a lower surface of the pump bracket 6 in a radial shape.

* * * * *